United States Patent Office 2,890,229
Patented June 9, 1959

2,890,229

PROCESS FOR PREPARING HIGH MOLECULAR WEIGHT ESTERS

Carl B. Linn, Riverside, Ill., assignor, by mesne assignments, to Universal Oil Products Company, Des Plaines, Ill., a corporation of Delaware No Drawing. Application January 30, 1956
Serial No. 561,993

4 Claims. (Cl. 260—410.6)

This invention relates to high molecular weight esters and to the process for their preparation which comprises interacting an aliphatic acid, a carbohydrate, and an aromatic compound having at least two hydrogen atoms attached separately and independently to adjacent nuclear carbon atoms. The process relates more particularly to the condensation of an aliphatic acid, a carbohydrate selected from the group consisting of simple sugars, their desoxy- and omega-carboxy derivatives, compound sugars or oligosaccharides, and polysaccharides, and an aromatic compound having at least two hydrogen atoms attached separately and independently to adjacent nuclear carbon atoms, one of such hydrogen atoms being activated, said condensation being carried out in the presence of an acid-type alkylation-esterification catalyst at alkylation-esterification conditions.

An object of this invention is to produce high molecular weight esters suitable for use per se or as intermediates in the manufacture of detergents, pharmaceuticals, surface coatings, resins, and plasticizers.

One embodiment of this invention relates to a process which comprises reacting an aliphatic acid, a carbohydrate, and an aromatic compound having at least two hydrogen atoms attached separately and independently to adjacent nuclear carbon atoms, one of said hydrogen atoms being activated, the reaction being carried out at alkylation-esterification conditions in the presence of an acid-type alkylation-esterification catalyst.

Another embodiment of this invention relates to a process which comprises reacting an aliphatic acid, a carbohydrate, and an aromatic compound having at least two hydrogen atoms attached separately and independently to adjacent nuclear carbon atoms one of said hydrogen atoms being activated, the reaction being carried out at alkylation-esterification conditions in the presence of an alkylation-esterification catalyst comprising hydrofluoric acid.

Still another embodiment of this invention relates to a process which comprises reacting a monobasic aliphatic acid, a monosaccharide, and an aromatic compound having at least two hydrogen atoms attached separately and independently to adjacent nuclear carbon atoms, one of said hydrogen atoms being activated, the reaction being carried out at alkylation-esterification conditions in the presence of an alkylation-esterification catalyst comprising hydrofluoric acid.

Another embodiment of this invention relates to a process which comprises reacting a monobasic saturated aliphatic acid, a monosaccharide, and an aromatic compound having at least two hydrogen atoms attached separately and independently to adjacent nuclear carbon atoms, one of said hydrogen atoms being activated, the reaction being carried out at alkylation-esterification conditions in the presence of an alkylation-esterification catalyst comprising hydrofluoric acid.

Still another embodiment of this invention relates to a process which comprises reacting a monobasic unsaturated aliphatic acid, a monosaccharide, and an aromatic compound having at least two hydrogen atoms attached separately and independently to adjacent nuclear carbon atoms, one of said hydrogen atoms being activated, the reaction being carried out at alkylation-esterification conditions in the presence of an alkylation-esterification catalyst comprising hydrofluoric acid.

A specific embodiment of this invention relates to a condensation process which comprises condensing a monoarylated fatty acid at condensation conditions in the presence of a condensation catalyst comprising hydrofluoric acid with a compound represented by the following formula:

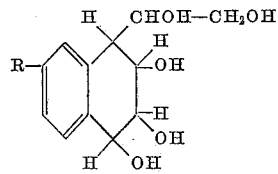

in which R is selected from the group consisting of alkyl, aralkyl, cycloalkyl, aryl, alkaryl, and carboxyaryl radicals.

Another specific embodiment of this invention relates to a process which comprises condensing phenyl stearic acid with (7-(9-stearic acid)-2,3,4-trihydroxy-1,2,3,4-tetrahydro-1-naphthalene)-ethylene glycol at condensation conditions in the presence of a condensation catalyst comprising hydrofluoric acid.

I have found that useful condensation products are formed by reacting aliphatic acids, carbohydrates, and aromatic compounds having at least 2 hydrogen atoms attached separately and independently to adjacent carbon atoms, one of said hydrogen atoms being activated, in the presence of an acid type alkylation-esterification catalyst, and particularly in the presence of hydrofluoric acid. These reactions may be carried out in steel equipment or in other suitable apparatus lined with such inert materials as silver, copper, steel, and certain alloys such as Monel metal and the like. These condensations may be effected at temperatures of from about —40° to about 150° C. and preferably at temperatures of from about 0 to about 50° C. While many of the condensation reactions are carried out at substantially atmospheric pressure, it may be desirable in certain instances and with certain reactants to carry out the reaction at pressures up to 100 atmospheres or more. When utilizing pressure it is convenient in most instances to operate the equipment utilized at the autogenous pressure generated by the reaction mixture contained therein.

Aliphatic acids which may be used as starting materials in the process of this invention are monobasic and dibasic aliphatic acids such as monobasic saturated aliphatic acids, monobasic unsaturated aliphatic acids, aryl substituted monobasic fatty acids, dibasic saturated aliphatic acids, and dibasic unsaturated aliphatic acids. Typical utilizable monobasic saturated aliphatic acids include formic acid, acetic acid, propionic acid, butyric acid, valeric acid, caproic acid, oenanthic acid, caprylic acid, pelargonic acid, capric acid, undecyclic acid, lauric acid, tridecylic acid, myristic acid, pentadecylic acid, palmitic acid, margaric acid, stearic acid, nonadecylic acid, etc. Typical utilizable unsaturated monobasic acids include those of the so-called oleic acid series such as acrylic acid, crotonic acid, and its isomer iso-crotonic acid, vinyl acetic acid, angelic acid and its isomer tiglic acid, oleic acid and its isomer elaidic acid, erucic acid, and its isomer brassidic acid, nervonic acid, etc. Typical utilizable saturated dibasic aliphatic acids include oxalic acid, malonic acid, succinic acid, glutaric acid, adipic acid, pimelic acid, suberic acid, azelaic acid, sebacic acid, nonane dicarboxylic acid, undecane dicarboxylic acid, etc. Typical utilizable unsaturated dibasic acids include maleic and fumaric acids, citraconic acid, mesaconic acid, itaconic acid, etc.

Carbohydrates which are condensed with the above-mentioned aliphatic acids and with aromatic compounds having at least two hydrogen atoms attached separately and independently to adjacent nuclear carbon atoms, one of said hydrogen atoms being activated, include simple sugars, their desoxy- and omega-carboxy acid derivatives, compound sugars or oligosaccharides, and polysaccharides. Simple sugars include dioses, trioses, tetroses, pentoses, hexoses, heptoses, octoses, nonoses, and decoses. Compound sugars include disaccharides, trisaccharides, and tetrasaccharides. Polysaccharides include polysaccharides composed of only one type of sugar residue, polysaccharides composed of more than one type of sugar unit, polysaccharides composed of one type of uronic acid, polyuronides, polysaccharides composed of aldose (pentose or hexose) and uronic acid units, polysaccharides containing hexose units esterified with an inorganic acid, and polysaccharides containing amino sugar units.

Utilizable simple sugars include the diose, glycolaldehyde; trioses, such as glyceraldehyde, and s-dihydroxy-acetone; tetroses, such as erythose, threose, erythrulose, and apiose; the pentoses such as arabinose, xylose, ribose, lyxose, rhamnose (a desoxy hexose) fucose (a desoxy hexose), rhodeose, digitalose, and ketoxylose; the hexoses such as mannose, glucose, iodose, gulose, galactose, talose, allose, altrose, fructose, sorbose, tagatose, and psicose; the heptoses such as glucoheptose, mannoheptose, galactoheptose, sedoheptose, mannoketoheptose; glucoheptulose, perseulose; octoses such as glucooctose, mannooctose, and galactooctose; nonoses such as gluconose, and mannononose; and decoses such as glucodecose. Dexosy derivatives of simple sugars are formed by the replacement of a hydroxyl substituent in a sugar with hydrogen, thereby forming a methyl or methylene linkage. The desoxy pentoses and desoxy hexoses are the most commonly occurring of such compounds. The omega-carboxy derivatives of simple sugars, which are suitable in the process of the present invention include tartronic semialdehyde, or its tautomer, hydroxypyruvic acid, alpha, beta-dihydroxyacetoacetic acid, threuronic acid, 4-keto-2,3,5-trihydroxypentanoic acid, xyluronic acid, 5-keto-hexanoic acids such as 5-keto-allonic acid, 5-keto-gluconic acid, 5-keto-mannonic acid, 5-keto-gulonic acid, and 5-keto-galacturonic acid, uronic acids such as glucouronic acid, and galacturonic acid, and the 6-keto-heptanoic acids.

The simple sugars and their omega-carboxy derivatives, as starting materials in the process of this invention, may be represented by the following general formula:

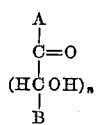

in which A=hydrogen, and CH₂OH, n=an integer of from 1 to about 12 or so, and B=H, CH₂OH, and COOH. As an example of the utility of this general formula when A=H, n=1, and B=H, the compound is glycolaldehyde; when A=H, n=1, and B=CH₂OH, the compound is glyceraldehyde; when A=H, n=1, and B=COOH, the compound is tartronic semialdehyde, a tautomer of hydroxypyruvic acid; when A=CH₂OH, n=1, and B=H, the compound is s-dihydroxyacetone; when A=CH₂OH, n=1, and B=CH₂OH the compound is erythrulose; when A=CH₂OH, n=1, and B=COOH, the compound is alpha, beta-dihydroxy-acetoacetic acid; when A=H, n=2, and B=CH₂OH, the compound is erythrose, or threose; when A=H, n=2, and B=COOH, the compound is threuronic acid; when A=CH₂OH, n=2, and B=CH₂OH, the compound is riboketose, or xyloketose; when A=CH₂OH, n=2, and B=COOH, the compound is 4-keto-2,3,5-trihydroxy-pentanoic acid; when A=H, n=3, and B=CH₂OH, the compound is ribose, arabinose, xylose, or lyxose; when A=H, n=3, and B=COOH, the compound is xyluronic acid; when A=CH₂OH, n=3, and B=CH₂OH, the compound is psicose, fructose, sorbose, or tagatose; when A=CH₂OH, n=3, and B=COOH, the compound is 5-keto-2,3,4,6-tetrahydroxy-hexanoic acid; when A=H, n=4, and B=CH₂OH, the compound is allose, altrose, glucose, mannose, gulose, idose, galactose, or talose; when A=H, n=4, and B=COOH, the compound is a uronic acid; when A=CH₂OH, n=4, and B=CH₂OH, the compounds are heptoses; and when A=CH₂OH, n=4, and $$B=COOH$$

the compounds are 6-keto-2,3,4,5,7-pentahydroxyheptanoic acids.

The utilizable oligosaccharides or compound sugars include disaccharides such as pentose-hexose saccharides including glucoapiose, vicianose, and primeverose; the methylpentose-hexose saccharides including glucorhamnoside and rutinose; the dihexoses such as turanose, maltose, lactose, cellobiose, gentiobiose, melibiose, sucrose, and trehalose. Other compound sugars are represented by the trisaccharides such as the methylpentose-hexose saccharides including rhamninose, and robinose; the trihexose saccharides such as mannotriose; and the trihexoses including raffinose, melezitose, and gentianose. An example of a suitable tetrasaccharide is stachyose.

Various polysaccharides are also utilizable in the process of the present invention. Such polysaccharides are converted to monosaccharide units during the process of the present invention and include pentosans such as araban, methylpentosans such as fucosan, the hexosans such as starch, cellulose, glycogen, inulin, mannan, galactan, lichenin, levan, dextran, and laminarin. All of the above polysaccharides are composed of one type of sugar residue. Other polysaccharides which are composed of more than one type of sugar unit such as the pentosans, like araboxylan, and the hexosans like galactomannan may be used. Other utilizable polysaccharides are represented by those composed of uronic acid units such as pectic acid and alginic acid; those composed of aldose (pentose or hexose) and uronic acid units such as gum arabic, damson gum, gum tragacanth, linseed mucilage, and pectins, and those containing hexose units partially esterified with an inorganic acid such as seaweed polysaccharides like agar.

Suitable aromatic compounds utilizable in the process of the present invention as hereinabove set forth comprises aromatic compounds having at least two hydrogen atoms attached separately and independently to adjacent nuclear carbon atoms, one of such hydrogen atoms being activated. These aromatic compounds will always contain at least one substituent, a hydrogen atom attached to the carbon atom in the para position to said substituent, and in addition, another hydrogen atom attached separately and independently to a carbon atom adjacent to said aforementioned carbon atom in the para position to said substituent. This definition and limitation excludes benzene, the simplest member of the aromatic compound series, as a starting material. The fact that the carbon atom in the para position to the carbon atom containing a substituent contains a hydrogen atom results in this hydrogen atom being activated, a further necessary condition to obtain the reaction described herein. Of course, the aromatic compound may contain up to 4 substituents if the conditions as set forth hereinabove are fully met. The aromatic compounds included within the scope of the present invention can be represented by the following formula:

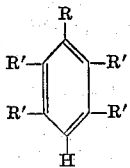

in which R is selected from the group consisting of alkyl, aralkyl, cycloalkyl, aryl, aralkyl, and carboxyaryl radicals, and R' is independently selected from the group consisting of hydrogen, alkyl, aralkyl, cycloalkyl, aryl, alkaryl, and carboxy aryl radicals. As will be shown in detail hereinafter, the desired aromatic compound starting material may be formed in situ. Typical utilizable alkylaromatic hydrocarbons include toluene, o-xylene, m-xylene, ethylbenzene, 1,2,3-trimethylbenzene, 1,2,5-trimethylbenzene, o-ethyltoluene, m-ethyltoluene, n-propylbenzene, isopropylbenzene, etc. Higher molecular weight monoalkyl aromatic hydrocarbons are also suitable such as those produced by the alkylation of aromatic hydrocarbons with olefinic polymers. Such products are referred to in the art as alkylate, and include hexylbenzene, hexyltoluene, nonylbenzene, nonyltoluene, dodecylbenzene, dodecyltoluene, etc. Very often alkylate is obtained as a high boiling fraction in which case the alkyl group attached to the aromatic hydrocarbon varies in size from $C_9$ to $C_{18}$.

Other suitable utilizable aromatic compounds include aralkyl aromatic compounds, aryl substituted aromatic compounds, alkaryl aromatic compounds, and aryl substituted aliphatic acids. Specific utilizable compounds include diphenylmethane, cyclohexylbenzene, biphenyl, p-phenyltoluene, phenylacetic acid, phenylpropionic acid, phenylbutyric acid, phenylvaleric acid, phenylcaproic acid, phenylcaprilic acid, phenylcapric acid, phenyllauric acid, phenylpalmitic acid, phenylstearic acid, etc.

These aryl substituted fatty acids may in some instances be produced in situ by the utilization of a charging stock containing benzene and an unsaturated fatty acid which will react in the presence of an acid catalyst to yield an aryl substituted fatty acid which then reacts with the carbohydrate and further aliphatic acid to yield the products of the reaction as set forth hereinabove. For example, a suitable charging stock comprises sufficient benzene and an unsaturated fatty acid such as oleic acid which react to give a mixture of 9- and/or 10-phenyl stearic acid which then reacts with the carbohydrate such as glucose in the alkylation reaction and in addition acts as the esterification agent. This feature of the invention will be exemplified further in the examples by way of illustration.

The acid-type alkylation-esterification catalyst which is used in the process of this invention comprises preferably hydrogen fluoride. The hydrogen fluoride may be used in anhydrous form or it may be diluted with water to make hydrofluoric acid of the desired concentration. The hydrofluoric acid may also be further diluted with various inert diluents when it is desired to operate the process of this invention with low hydrogen fluoride concentrations. Suitable inert diluents include perfluoro derivatives of n-paraffinic hydrocarbons such as perfluoropropane, perfluoro-n-butane, perfluoro-n-pentane, perfluoro-n-hexane, etc. Other suitable diluents are apparent to one skilled in the art. For example, cycloparaffins such as cyclopentane and cyclohexane may be used. In some instances, hydrofluoric acid of from about 85 to about 100% HF concentration is desirable and in other instances it is most desirable to use anhydrous hydrogen fluoride as the catalyst.

This process may be carried out by slowly adding a hydrogen fluoride catalyst to a stirred mixture of aliphatic acid, carbohydrate, and suitable aromatic compound being subjected to reaction while maintaining the reaction temperature at from about −40° to about 150° C. by suitable cooling and/or heating means. It is often desirable or advisable to commingle the reactants and catalysts at a relatively low temperature such as from about −80° to about −30° and then to permit the reaction mixture to warm gradually while the reactants and catalysts are stirred by suitable means such as a motor driven stirrer or other adequate mixing equipment. After the reaction has reached the desired degree of completion, the hydrogen fluoride catalyst is removed from the reaction mixture by distillation at atmospheric or lower pressures, or by passing an inert gas through the reaction mixture while maintaining it at relatively low temperature. Also, the entire reaction mixture and catalyst may be mixed with water, or may be added to ice in order to quench the activity of the hydrogen fluoride catalyst and permit separation of the organic reaction products and unreacted starting materials from the catalyst. The organic reaction products may also be separated from aqueous hydrogen fluoride by means of an organic solvent such as ether, in which some of the organic material may be dissolved. Thus, the product formed by reacting phenylstearic acid (which acts both as the desired aromatic compound and as the aliphatic acid) with glucose in the presence of substantially anhydrous hydrogen fluoride at 0° C. separated into a water-soluble and a water-insoluble product which water-insoluble product is soluble in benzene and other hydrocarbons.

The process of this invention broadly emphasizes the reaction of aliphatic acids, carbohydrates, and certain aromatic compounds using as a catalyst hydrogen fluoride in which process the type of product is markedly affected by the length of time that the reactants are in contact with the hydrogen fluoride catalyst as well as the temperature of the reaction and the mol ratios of the reactants utilized.

The reaction products of this process lead to materials having diversified uses. Some of these are enumerated as follows:

(a) Detergents:
    (1) *Sulfonate type.*—Sulfonation of some of the products leads to compounds of R—$SO_3H$ type which can be converted into surface active salts.
    (2) *Sulfate type.*—Sulfation of these products lead to compounds of the $ROSO_3H$ type which, if desired, can be converted into salts.
    (3) *Nonionic type.*—Some of the products are water-soluble to different degrees. Thus, for example, it is possible to make a series of surface active agents with increasing hydrophobic-hydrophilic ratio in the molecule by reacting the products with alkaline oxides.
    (4) *Detergent aids.*—The structure of some of the products are related to compounds found useful as detergent aids (that is, compounds which when added to a detergent in small concentrations rather markedly increase their effectiveness). They may accordingly find use in that field.

(b) *Surface coatings and resins:* Some of the reaction products can be used per se as surface coating materials. Resins can be made by heating many of the reaction products with formaldehyde, urea, phenol, aniline, etc., and combinations of the above-enumerated compounds.

(c) *Plasticizers:* It is possible to balance the hydrophobic and hydrophilic parts of the molecule, going all the way from water-soluble hydrophilic materials to hydrophobic acting compounds, wherein the aromatic derivative part predominates over the oxygenated part, thus producing new plasticizing agents.

The nature of this invention is illustrated further by the following examples which, however, should not be construed to limit unduly the generally broad scope of this invention.

Example I

This example illustrates the reaction of equimolecular quantities of glucose with phenylstearic acid, which phenylstearic acid acts both as the desired aromatic compound and the desired aliphatic acid. The phenylstearic acid is produced in situ by reaction of oleic acid with excess benzene. Into a steel autoclave provided with a mechanically driven stirrer was charged 36 grams (0.2 mol) of d-glucose, 56.5 grams (0.2 mol) of oleic acid, 265 grams (3.4 mols) of benzene and 200 ml. of pentane. This mixture was cooled to about −80° C. and 233 grams of anhydrous hydrogen fluoride was pressured into the autoclave at this temperature. The temperature was then allowed to rise to 0° C. at which temperature stirring was continued for two and one-half hours.

At the end of the reaction time, a rapid stream of nitrogen was passed through the reaction mixture and out of the autoclave for about two hours. The exit gas mixture of hydrogen fluoride, nitrogen, and pentane (used as a diluent) was vented to a hood. The autoclave was opened and the contents (155 g.) were transferred into a silver dish and allowed to stand in a strong hood draft for 48 hours.

The crude product was then water-washed and extracted with pentane. The water wash was evaporated to dryness disclosing 8 grams of a water-soluble amber glass which was found to be partially inorganic. From the pentane extract there was isolated 82 grams of a dark brown pentane soluble viscous liquid. This viscous liquid was found to be a non-acid acting ester of molecular weight 1750. Hydrolysis of a portion of this ester with caustic followed by neutralization yielded a dark amber acid-oil with an equivalent weight of 514. It is thus believed that this hydrolyzed product is the reaction product of one mol proportion of phenylstearic acid with one mol proportion of glucose to yield a compound which can be represented by the following structure:

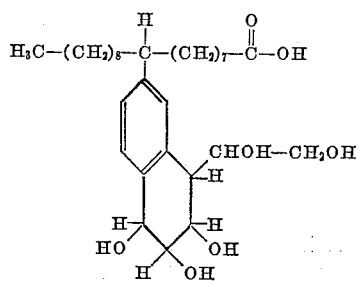

(7-(9-stearic acid)-2,3,4-trihydroxy-1,2,3,4-tetrahydro-1-naphthalene)-ethylene glycol The above compound has a molecular weight of 522 in comparison to the equivalent weight found, that is, 514. It will be observed that esterification of one or more of the free hydroxyl groups yields a high molecular weight ester such as found in the reaction product. Furthermore, reaction of the above free acid can take place with phenylstearic acid to yield an anhydride which may be a portion of the total reaction product. Since this viscous liquid originally contained no free carboxyl groups such an assumption seems valid since the free acid groups must have been released from ester and anhydride linkages after treatment with caustic solution.

In addition to the above products 1–2 grams of a dark green rubbery solid was isolated after boiling in several batches of distilled water until the pH of the final wash approached neutrality.

A 5% solution of the non-acid acting ester dissolved in a 30 viscosity lubricating oil raised the viscosity index of the latter.

The sodium salt may be used as a lubricating grease. The original product may be esterified with ethylene glycol to give a series of products which are surface active and useful as greases.

Example II

This example illustrates the reaction of phenylstearic acid with glucose, two molecular proportions of phenylstearic acid being present per molecular proportion of glucose. Here again, the phenylstearic acid acts both as the desired aromatic compound and the desired aliphatic acid. The phenylstearic acid is again produced in situ by the reaction of oleic acid with excess benzene. Into a steel autoclave provided with a mechanically driven stirrer is charged 36 grams (0.2 mol) of d-glucose, 113 grams (0.48 mol) of oleic acid, and 261 grams (3.3 mols) of benzene. This mixture was cooled to about −80° C. and 201 grams of anhydrous hydrogen fluoride were pressured into the autoclave at this temperature. The temperature was then allowed to rise to 0–2° C. at which temperature stirring was continued for 17 hours.

At the end of the reaction time, a rapid stream of nitrogen was passed into the reaction mixture and out of the autoclave for about two hours. The exit gas mixture of hydrogen fluoride and nitrogen was vented to a hood. The autoclave was opened, and the contents were transferred into a silver dish and allowed to stand in a strong hood draft for 24 hours.

The crude product (155 grams) was then water washed and extracted with pentane. Ten grams of water soluble material was noted by evaporation of the water wash to dryness of a steam bath. The remainder of the product (pentane soluble) was a heavy, light brown oil soluble in benzene and other hydrocarbons and which was found to have both a molecular weight and equivalent weight of near 1200. This product did not oxidize to terephthalic acid, or to other identifiable aromatic carboxylic acid, the characteristic reaction for a tri-substituted aromatic. The compound was also found to contain one free carboxyl group per molecule. A structure which is in accord with the above and which has the correct molecular weight is given below:

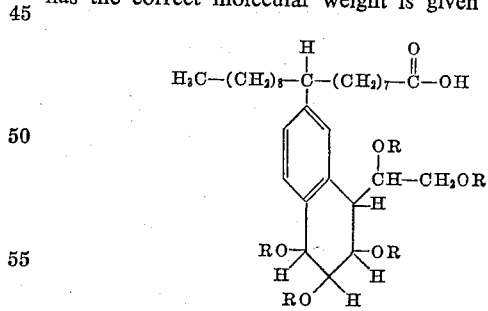

in which R is selected from hydrogen and

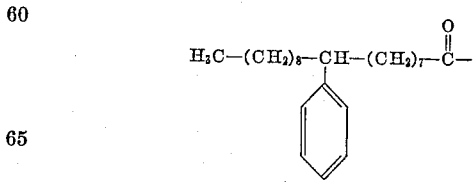

and where 3 of the R's are hydrogen and two of the R's are the 9-phenyl stearyl radical indicated above. Such a composition of matter has a molecular weight of 1208.

I claim as my invention:

1. The process which comprises reacting phenylstearic acid and glucose in the presence of a hydrogen fluoride catalyst at a condensation temperature of from about −40° to about 150° C.

2. The process which comprises condensing from one to two molecular proportions of phenylstearic acid and one molecular proportion of glucose at about 0° C. in the presence of a hydrogen fluoride catalyst.

3. The process which comprises condensing equimolecular proportions of phenylstearic acid and glucose at about 0° C. in the presence of a hydrogen fluoride catalyst.

4. The process which comprises condensing two molecular proportions of phenylstearic acid and one molecular proportion of glucose at about 0° C. in the presence of a hydrogen fluoride catalyst.

References Cited in the file of this patent

UNITED STATES PATENTS

| | | |
|---|---|---|
| 2,192,907 | Harris | Mar. 12, 1940 |
| 2,275,494 | Bennett | Mar. 10, 1942 |
| 2,460,803 | Bonner et al. | Feb. 8, 1949 |
| 2,472,276 | Bonner et al. | June 7, 1949 |
| 2,722,521 | Shaw et al. | Nov. 1, 1955 |

OTHER REFERENCES

Berkman: Catalysis, 1940, page 193.

Groggins: Unit Processes in Organic Synthesis, 1952, pages 607–608 and 833.